(12) United States Patent
Kuhn (10) Patent No.: US 9,139,463 B2
(45) Date of Patent: Sep. 22, 2015

(54) UNIT AND PROCESS FOR TREATING THE SURFACE OF FLAT GLASS WITH THERMAL CONDITIONING OF THE GLASS

(75) Inventor: Wolf Stefan Kuhn, Fontenay le Vicomte (FR)

(73) Assignee: FIVES STEIN (FR)

( * ) Notice: Subject to any disclaimer, the term of this patent is extended or adjusted under 35 U.S.C. 154(b) by 384 days.

(21) Appl. No.: 13/056,610

(22) PCT Filed: Jul. 24, 2009

(86) PCT No.: PCT/FR2009/000922
§ 371 (c)(1),
(2), (4) Date: May 23, 2011

(87) PCT Pub. No.: WO2010/012890
PCT Pub. Date: Feb. 4, 2010

(65) Prior Publication Data
US 2011/0259052 A1    Oct. 27, 2011

(30) Foreign Application Priority Data

Jul. 30, 2008 (FR) ..................................... 08 04344
Oct. 24, 2008 (FR) ..................................... 08 05930

(51) Int. Cl.
C03B 32/00 (2006.01)
C03C 17/00 (2006.01)
C03B 23/02 (2006.01)
C03B 29/08 (2006.01)

(52) U.S. Cl.
CPC ................. *C03B 23/02* (2013.01); *C03B 29/08* (2013.01); *C03B 32/00* (2013.01); *C03C 17/002* (2013.01)

(58) Field of Classification Search
CPC .............................. C03B 32/00; C03C 17/002
USPC ........................................................ 65/30.13
See application file for complete search history.

(56) References Cited

U.S. PATENT DOCUMENTS

| 2,248,714 | A | | 7/1941 | Lytle | |
| 3,850,679 | A | * | 11/1974 | Sopko et al. | 427/255.19 |
| 4,536,204 | A | | 8/1985 | Van Laethem et al. | |
| 4,728,353 | A | * | 3/1988 | Thomas et al. | 65/60.1 |
| 4,917,717 | A | * | 4/1990 | Thomas et al. | 65/60.1 |
| 5,322,540 | A | | 6/1994 | Jacquet et al. | |
| 5,597,395 | A | * | 1/1997 | Bocko et al. | 65/33.4 |
| 2002/0038559 | A1 | * | 4/2002 | Hishinuma et al. | 65/99.2 |
| 2003/0233846 | A1 | | 12/2003 | Boaz | |

FOREIGN PATENT DOCUMENTS

DE    3808380 A1    9/1989

* cited by examiner

*Primary Examiner* — Matthew Daniels
*Assistant Examiner* — Cynthia Szewczyk
(74) *Attorney, Agent, or Firm* — The Belles Group, P.C.

(57) ABSTRACT

Unit for the surface treatment of flat glass, in particular in the form of a ribbon or a sheet, especially by modifying the chemical, optical or mechanical properties, or the deposition of one or more thin films, comprising heating and cooling means for creating a controlled temperature gradient through the thickness of the glass, means for heating that face to be treated, in order for it to always be at the required temperatures and for the times necessary for obtaining effective treatments of the surface thereof and means for cooling the opposite face in order for this opposite face to have a viscosity of between $10^{13}$ dPa·s and $2.3 \times 10^{10}$ dPa·s.

17 Claims, 3 Drawing Sheets

UNIT AND PROCESS FOR TREATING THE SURFACE OF FLAT GLASS WITH THERMAL CONDITIONING OF THE GLASS

CROSS REFERENCE TO RELATED APPLICATIONS

This application is a National Phase filing under 35 U.S.C. §371 of PCT/FR2009/000922 filed on Jul. 24, 2009; and this application claims priority to Application No. 0804344 filed in France on Jul. 30, 2008, and Application No. 0805930 filed in France on Oct. 24, 2008 under 35 U.S.C. §119; the entire contents of all are hereby incorporated by reference.

The invention relates to a unit for treating the surface of flat glass, in particular in the form of a ribbon or a plate, with a thermal conditioning of the glass for increasing the temperature of one of the faces of the glass to the temperatures required and during the periods necessary to obtain effective treatments of its surface, in particular by modifying the chemical, optical or mechanical properties, or the deposition of one or more thin layers.

This conditioning of the glass is carried out on a glass ribbon produced continuously by the float glass method, the rolling method or the drawing method. It is also applied during processes for treating plate glass, whether by continuous or batch feed. The glass may have been previously treated, for example by the deposition of a layer prepared in the tin bath.

The invention relates more particularly, but not exclusively, to treatment unit for the fabrication of flat glass intended for architecture, automotive or solar applications.

It is recalled that some of the applications described below increasingly require a surface treatment of the glass by the deposition of thin layers, often consisting of a plurality of successive layers. These layers serve for example to obtain solar reflection, low emissivity, electrical conductivity, tinting, antifouling and other properties.

To simplify the description, it is considered below that the surface treatment is carried out on the upper face. However, according to the invention, the face to be treated may equally be the upper face or lower face or both.

The modifications of the optical or mechanical properties of the glass surface can be obtained by a method for preparing a structure using an engraving roll on one of the faces of the glass ribbon.

Other applications require the transformation of the mechanical, chemical or optical properties of the glass by methods for changing the chemical and structural composition in a limited depth of the glass.

The main methods employed at atmospheric pressure for thin-film deposition are CVD (chemical vapour deposition), flame CVD, atmospheric plasma, SP (spray pyrolysis) methods. These methods can heat or cool the glass surface, to varying degrees. Pyrolysis methods require a high glass temperature to obtain the decomposition of the reactants and the formation of the layers, and are therefore particularly suitable when the flat glass is still at high temperature during its fabrication or during its processing (glass tempering, for example).

The fabrication of float glass implies the forming of the glass ribbon on a bath of molten tin from a temperature of 1000° C. to a temperature of about 620° C. for soda-lime glass. The forming of the ribbon at a constant thickness and width stops at about 800° C. Below this temperature, the ribbon geometry remains stable and a controlled cooling of the ribbon on the tin is continued. At the maximum temperature of 620° C., the ribbon is lifted slightly out of the bath by mechanical rollers to pass into a lehr. In this lehr, the ribbon is cooled from 620° C. to about 50° C. before being cut into panels.

The maximum temperature of about 620° C., equivalent to a viscosity of about $2.3 \times 10^{10}$ dPas, serves to obtain a quality meeting EN or ASTM standards. For lower quality requirements concerning the marking by the glass support means or the planeity defects, the bath outlet temperature may be higher.

For glass compositions different from those of standard soda-lime glass, the maximum temperature at the bath outlet may also be different.

Part of the CVD processes is installed in the tin baths in order to benefit from a high temperature of the glass that is favorable to the deposition and despite the relative inaccessibility of the ribbon surface. The tin bath is protected by a reducing atmosphere consisting of a N2+H2 mixture to prevent the oxidation of the molten tin. This atmosphere promotes the deposition of layers requiring a reducing atmosphere such as metal layers. Other methods, for example SP, cannot be used in the tin bath because they would pollute the atmosphere above the bath.

In an annealing tunnel such as a lehr, the atmosphere consists of air and the ribbon is normally transported on rollers. The glass surface is this more readily accessible for a deposition process. All SP systems and part of the CVD processes are thus installed in the initial section of the lehrs, in which the glass temperature is limited to a maximum value of 620° C.

The temperature of the ribbon surface plays a crucial role in the efficiency and quality and the pyrolytic deposition and surface transformation processes, for example by diffusion.

For example, a standard pyrolytic CVD treatment consists of the deposition of a thin layer of amorphous Si used as a reflective layer in architecture. The deposition is carried out by decomposition of the gas silane. The rate of the pyrolytic decomposition of silane is stow for temperatures <650° C. and is only partial at temperatures below 610° C. The limited temperature of the glass in a lehr considerably reduces the efficiency of the deposition process. Since the cooled reactor is very close to the glass, it also causes the glass to lose heat.

The SP treatment cools the glass ribbon more than the CVD process, thereby causing problems of glass deformation when the temperature drops locally below about 570° C. for soda-lime glass. This low temperature also causes a drop in reactant decomposition efficiency and poor adhesion of the layer.

Methods for processing the glass surface, for example to obtain a tinting by diffusion of colouring ions in the glass or a chemical or mechanical hardening by the diffusion of alumina, require a high glass temperature.

An electric field may also be applied in order to promote the diffusion of ions in a deposited layer and/or in the glass.

The deposition of chemical species on the glass surface can be carried out by various methods, such as the creation of nanoparticles in a flame or the decomposition of a reactant present in a CVD reactor. The rate of diffusion of the elements in the glass depends directly on the temperature. The latter is limited in the lehr, so that the glass remains below about 620° C. for soda-lime glass.

U.S. Pat. No. 4,536,204 describes a heating of the ribbon on the upper surface before coating in order to reduce the temperature heterogeneity across the width of the ribbon. Radiant heating means are employed. However, the heat flux injected into the glass must remain limited in order to avoid exceeding the maximum allowable temperature. The temperature level reached on the upper face and the temperature holding period are therefore limited.

U.S. Pat. No. 4,022,601 describes an SP coating device placed between the tin bath and the lehr. The maximum allowable temperature for the glass produced and the quality level required is 649° C. at the bath outlet. Since the coating device causes a considerable cooling of the glass, a heating device is installed at the upper face just upstream of the coating device, in order to compensate for this cooling and restore the glass to its initial temperature. A second heating means placed at the lower face at the coating device serves to compensate for the cooling caused by the coating process in order to prevent the deformation that would result from incipient freezing of the glass. This invention does not allow the heating of the glass to a temperature above the one it has at the bath outlet.

It is above all the object of the invention to raise the temperature of the glass face to be treated for greater efficiency of the methods described above, but without causing deformations and/or a marking of the glass by the support means placed on the opposite face to the treated face, in particular the support rollers.

The invention mainly consists of a unit for treating the surface of flat glass, in particular in the form of a ribbon or a plate, particularly by modifying the chemical, optical or mechanical properties, or by the deposition of one or more this layers, characterized in that it comprises heating and cooling means for creating a controlled thermal gradient in the glass thickness, means for heating the face to be treated so that it is always at the requisite temperatures and during the periods necessary to obtain effective treatments of its surface, and means for cooling the opposite face, so that this opposite face has a viscosity of between $10^{13}$ dPas and $2.3 \times 10^{10}$ dPas, preferably around $1.9 \times 10^{12}$ dPas.

Advantageously, the unit comprises in succession:
an initialization zone with means for heating the face to be treated and means for cooling the opposite face to reach the target temperatures at the face to be treated and at the opposite face,
a treatment zone with means for heating and means for treating the face to be treated, and means for cooling the opposite face to the treated face,
a homogenization zone, with cooling means,
and devices placed at the inlet and outlet of the treatment unit to limit the heat losses and the exchange of atmospheres.

The length of the initialization zone for reaching the target temperatures at the face to be treated and that the opposite face is determined so that the Peclet number Pe $$Pe = \frac{t_{diff}}{t_{conv}} = \frac{(\text{thickness} \cdot 0.5)^2}{\text{thermal\_diffusivity}} \cdot \frac{\text{speed}}{\text{length}}$$

is between 0.5 and 15, favorably between 3 and 5, with:
$t_{diff}$=characteristic time for the diffusion of the heat at depth, $t_{diff}$ being given by $t_{diff}$=(thickness/2)$^2$/thermal diffusivity,
$t_{conv}$=characteristic time for the horizontal transport of the ribbon in the initialization zone, $t_{conv}$ being given by $t_{conv}$=zone length/ribbon speed.

The unit may integrate one or more successive treatment devices placed on the same face or on the opposite faces of the glass.

The flat glass surface treatment unit comprises cooling means to maintain the opposite face at a temperature serving to prevent the marking of the glass by the support means and/or the deformation of the glass by a lack of mechanical strength, while preventing the freezing of the glass that would result from excessive cooling.

The invention also relates to a method for treating the surface of flat glass, in particular in the form of a ribbon or a plate, particularly by modifying the chemical, optical or mechanical properties, or by the deposition of one or more thin layers, characterized in that a controlled thermal gradient is created in the glass thickness by means for heating the face to be treated so that it is always at the requisite temperatures and during the periods necessary to obtain effective treatments of its surface, by means for cooling the opposite face, so that this opposite face has a viscosity of between $10^{13}$ dPas and $2.3 \times 10^{10}$ dPas, preferably around $1.9 \times 10^{12}$ dPas.

Advantageously, according to the method:
in an initialization zone, the face to be treated is heated and the opposite face is cooled to reach the target temperatures at the face to be treated and at the opposite face,
in a treatment zone, the face to be treated is heated and undergoes a treatment, while the opposite face to the treated face is cooled,
in a homogenization zone, the face opposite the treated face is cooled.

Preferably, in the initialization zone, the heat fluxes, positive and negative, on the two faces, are not balanced, thereby serving to slightly increase the average temperature of the ribbon.

In the treatment zone, the heating and cooling may be balanced on both faces, thereby serving to maintain a stable thermal gradient across the glass ribbon.

In the homogenization zone, the heating may, be stopped while the cooling is maintained.

According to the method, the opposite face is maintained at a temperature serving to prevent the marking of the glass by the support means and/or the deformation of the glass by a lack of mechanical strength, while preventing the freezing of the glass that would result from excessive cooling.

The implementation of the invention serves to increase the temperatures at which the surface treatments are carried out in order to improve their performance. This temperature increase can be obtained briefly when it is necessary to carry out a short-term treatment or it can be maintained over a longer period as required by the surface treatment.

This increase in temperature is made possible by the simultaneous cooling obtained on the opposite face to the face to be treated according to the invention. This simultaneous cooling serves to limit the temperature of the opposite face in order to limit the marking and collapse of the glass. It must be controlled in order to avoid a planeity defect caused by a partial freezing of the glass.

The inventive method is also characterized in that the thermal conditioning of the glass is carried out before and/or after the treatment device. It may also be applied during the treatment.

In the case in which the thermal conditioning is carried out during the treatment, the treatment device may integrate heating and/or cooling means.

The inventive method is also characterized in that the temperature of the upper face of the glass is adjusted along the surface treatment unit so as to optimize the treatments carried out.

According to the type of treatment, the upper face is heated to the target temperature and maintained at this temperature during the time necessary for carrying out the treatment.

The heating at the upper face and the cooling at the opposite face leads to a high thermal gradient in the glass. After the end of the treatment, the temperature homogenation in the glass thickness is favored, for example by means of a cooling of the upper face, in order to restore the usual temperature conditions at the treatment unit outlet and at the lehr inlet.

According to an alternative embodiment of the invention, the glass has not reached its usual lehr inlet temperature at the treatment unit outlet. In this case, it is necessary to adjust the initial cooling of the lehr, for example by means of a reinforced upper cooling and/or by a prolongation of the first zone.

According to another treatment example, the temperature to which the ribbon surface is heated is adjusted along the thermal conditioning unit in order to optimize the treatment efficiency, the temperature of the face to be treated being higher than 620° C. while ensuring that the temperature of the opposite face remains within the recommended temperature range, between 550° C. and 620° C. for soda-lime glass.

For other glass grades, an equivalence of these temperature levels is obtained by expressing them by a viscosity. The viscosity of the face to be treated is higher than about $2.3 \times 10^{10}$ dPas, while ensuring that the temperature of the opposite face remains within the recommended viscosity range, between about $10^{13}$ dPas and $2.3 \times 10^{10}$ dPas.

According to an exemplary embodiment of the invention, the temperature of the face to be treated is alternated at a point on the glass between a high value and a low value about an average temperature, while maintaining the opposite face at a temperature of about 570° C. for soda-lime glass, corresponding to a viscosity of about $1.9 \times 10^{12}$. This embodiment serves to reinforce the diffusion treatments in the glass thickness when this diffusion obeys an Arrhenius type law, because the temperature peaks give rise to greater diffusion than a simple holding at the average temperature.

The inventive method is also characterized in that the treatment unit integrates one or more successive glass treatment devices, for example to carry out a stacking of the various layers, to combine a layer with a diffusion method, or to produce a single very thick layer. These successive treatment devices may be of different types, such as an SP followed by a CVD, then a flame CVD. This surface treatment The unit as claimed in the invention serves to carry out in the unit the treatments normally carried out in the tin bath or in the lehr. It also serves to overcome the current limitations by reversing the order in which the methods are implemented. It is in fact possible to carry out an SP treatment first followed by high temperature CVD treatment, as carried out in the tin bath, whereas this was not hitherto possible because the use of an SP in the bath is prohibited.

The inventive method serves to place treatment devices on a single face or on both faces of the glass. The implementation of treatments on both faces serves for example to combine a functional layer on one face, for example anti-reflection, and an electrically conductive transparent layer on the opposite face.

The type and order of the treatment methods implemented rill be adapted to the result intended by the glass treatment.

The thermal requirements of the various treatments may be different, thereby requiring an adjustment of the heat fluxes imposed on the two faces of the glass. The adjustment of the flow of the flux on the face to be treated serves to obtain the temperature required for each of the treatments. It is necessary for example to heat more intensely upstream than downstream of an SP.

The incentive method is also characterized in that the temperature of the upper face of the glass is adapted along the thermal conditioning unit in order to optimize each successive treatment.

The inventive method is also characterized in that the temperature of the face of the glass to be treated is higher than 620° C., while the temperature of the opposite face of the glass is between 550° C. and 620° C. in the thermal conditioning unit in the case of a soda-lime glass supported by mechanical means such as rollers.

According to an exemplary embodiment of the invention, when a high flux and high surface temperature are necessary for carrying out the treatment, a cooling of the treated face is also provided after the treatment in order to remove more heat.

The heating means according to the invention serves to obtain a transverse temperature profile with an alternation between different temperature levels. The intensity of the cooling of the lower face is also transversally adjusted. These different temperature levels at the upper face serve to obtain a variation, across the width of the glass, of the thickness of a deposit, of the scale of a diffusion, or any other modification. For example, for the fabrication of photovoltaic cells, it is possible to produce a metal deposition of successive strips in order to contact several photovoltaic cells.

According to the invention, the chemical composition, pressure and temperature of the atmosphere in the treatment unit are adapted to each treatment implemented.

A reducing atmosphere is required for the deposition of certain layers, such as metal layers. For safety reasons, the pressure in the unit may be higher or lower than the atmospheric pressure according to the species present in the treatment unit. The treatment unit may comprise sections in which the atmosphere is different, so as to be adapted to the treatment carried out in each section. The atmosphere present in the treatment unit may be provided from the tin bath, after an optional filtration. In general, the atmosphere in the treatment unit must be free of dust, and this may require a filtration of the injected gases.

In the case of the float glass process, the treatment The unit as claimed in the invention is placed between the bath outlet and the lehr or integrated in the beginning of the lehr. It may be separated from or joined to the tin bath and/or the lehr.

In order to define the thermal parameters for the thermal conditioning of the glass, it is necessary to take the following into account:
 thickness to be heated to the temperature required for treatment,
 speed of the glass,
 thermal diffusivity of the glass,
 enthalpy of the glass,
 emissivity of the glass.

The treatment The unit as claimed in the invention is suitable for treating a broad range of glass thicknesses, for example from 2 to 25 mm. The variety of the possible treatments therefore requires an appropriate thermal dimensioning to obtain the desired result, while preventing overheating of the glass, an excessively large installation, or excessive energy consumption.

A The method as claimed in the invention serves simply and rapidly to determine the optimal conditions for the heating and cooling of the ribbon to be printed to various depths for a vast range of float glass products. It is described for an exemplary embodiment.

Apart from the arrangements discussed above, the invention consists of a number of other arrangements which are addressed more explicitly below with regard to exemplary embodiments for soda-lime glass described with reference to the appended drawings, but which are not at all limiting. In these drawings.

The transport of a ribbon at a high temperature faces major problems, such as marking by the rollers or the collapse and deformation of the glass between two rollers.

For soda-lime glass, experience shows that for a typical travel speed of 10 to 20 m/min, a temperature of about 620° C. is the upper limit to prevent the marking of the ribbon by the support rollers or the collapse between the rollers. For lower speeds, such as in the plate glass processing furnaces, the maximum allowable temperature is lower, about 580° C.

For soda-lime glass, experience also shows that a temperature of about 570° C. is the lower limit below which the glass begins to freeze.

During a cooling of a glass plate or ribbon, the two faces must be cooled symmetrically. For a glass at a temperature above the transition temperature Tg, a symmetrical cooling first causes a symmetrical freezing of the two faces, and then the freezing of the volume. When the freezing does not occur symmetrically on both faces, this causes curvature of the glass. If only one face begins to freeze, the glass plate or ribbon is deformed.

To take account of these risks, the invention provides for maintaining the opposite face in contact with the rollers at a temperature of between 50° C. and 620° C. for soda-lime glass.

The collapse and deformation between rollers depends on the glass temperature. A uniform temperature of about 620° C. for soda-lime glass is the upper limit at which significant collapse of the glass is observed for a roller spacing of 500 mm, a standard distance in a lehr.

Excessive collapse between the rollers would be liable to form permanent warping in the glass.

For certain glass treatments, like the deposition of a thin film by CVD, it is indispensable to maintain excellent planeity of the glass due to the reduced clearance between the glass surface and the CVD reactor.

Lifting tables are also used to transport the glass. The absence of mechanical contact may allow a slightly higher temperature than 620° C. However, the drop in viscosity rapidly lowers the mechanical strength of the glass.

A temperature of about 620° C. is therefore the upper limit of a soda-lime glass in a thermal conditioning system for flat glass with mechanical transport.

In order to improve the performance of a surface treatment method, for example by CVD, the invention provides for increasing the temperature of the face to be treated, for example to 650° C. A heater placed just upstream of the CVD reactor serves to increase the temperature of the upper face of the glass, normally the face to be treated, without causing any increase in the temperature of the opposite face. This heat flux must be removed rapidly after the CVD reactor so as to avoid exceeding the maximum allowable temperature at the lower face. In the case in which the reactor causes few heat losses, which is desirable for the deposition of the intended layer, a cooling of the treated face may be carried out after the reactor. However, this option is unsatisfactory for a glass having a usual thickness, of 3 to 5 mm, because the diffusion of heat that occurs during the heating and during the deposition causes a rapid and excessive increase in temperature of the opposite face, which, is liable to cause the marking of the glass by the rollers. In the case in which consecutive CVD reactors are used to produce a stack of layers, the problem of heat diffusion in the ribbon thickness would be even more pronounced. This configuration would also lead to additional collapse of the ribbon between the rollers, which is detrimental to CVD treatment.

The invention calls for a cooling of the opposite face to maintain it at a temperature such as to avoid the marking of the glass by the support means and/or the deformation of the glass by the lack of mechanical strength, while preventing the freezing of the glass that would result from excessive cooling.

Figure 1:
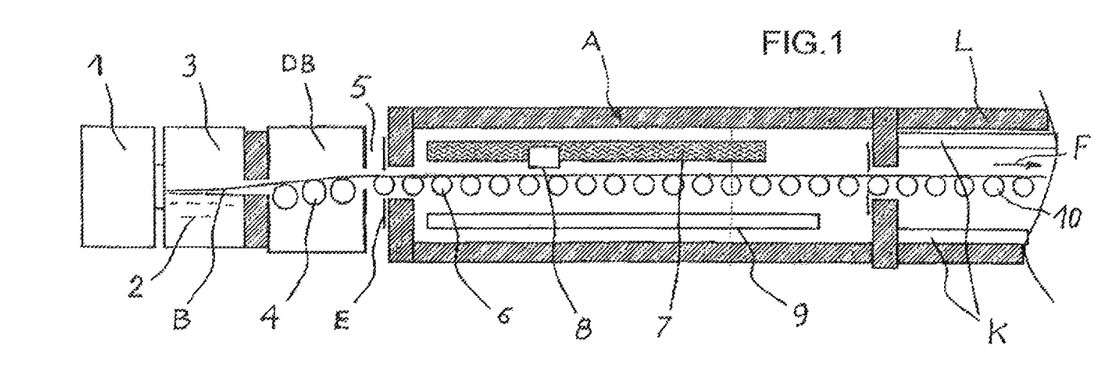
FIG. 1 is a schematic longitudinal section of a float glass production line, employing the inventive method.

FIG. 1 of the drawings shows a first exemplary embodiment of the invention, with a schematic representation of a glass ribbon production installation according to the float glass process.

The installation comprises a furnace 1 in which the glass materials, sand, flux, cullet, etc., serving for the fabrication of the glass, are introduced. A glass ribbon B in the pasty state leaves the furnace 1, supported by a molten tin bath 2 occupying the lower portion of a float chamber 3 under reducing atmosphere, in particular an atmosphere of nitrogen and hydrogen. The glass is formed on the tin bath at a temperature of between about 1000° C. and 600° C.

At the outlet end of the chamber 3, the glass ribbon B is lifted, from the tin bath and passes into the drossbox DB for bath outlet) on rollers 4 called Lift Out Rollers. The ribbon B then passes through a space 5 in the open air, for a length of a few tens of centimeters. This space is sometimes closed and provided with means for removing gas from the tin bath.

The ribbon B then enters a surface treatment unit A according to the invention. This comprises rollers 6 as glass transport means, a heating device 7 and a treatment unit 8 at the upper face of the glass, and a cooling device 9 at the lower face, opposite the heating device 7. Devices E placed at the inlet and outlet of the treatment unit 8 serve to limit the heat losses and the exchange of atmospheres.

After the treatment unit, the glass enters the lehr L. Throughout the lehr, the glass ribbon is supported horizontally by rollers 10 rotated at the ribbon feed speed. An adjustable tensile force F is applied to the ribbon B. The intensity of the tensile force F serves to act on the forming of the ribbon B in the tin bath 3. Coolers K are provided above and below the ribbon.

The data considered for this exemplary embodiment are the following:
  A clear soda-lime glass ribbon without thin layer having a width of 37 m, a thickness of 4 mm, and a travel speed of 15 in/min.
  The surface treatment is carried out after the LOR rollers 4 but before the start of annealing of the ribbon, the glass being at a temperature of 610° C.
  The surface treatment requires heating the upper face to the temperature of 650° C.

The surface treatment requires maintenance of this temperature for 12 seconds, corresponding to a length of 3 m at 15 m/min.

The surface treatment system has no impact on the heat transfer of the ribbon, that is, it does not alter the temperature of the ribbon.

Other exemplary embodiments discussed below will serve to address the case in which the surface treatment system has an impact on the heat transfer of the ribbon.

We shall now consider this exemplary embodiment in greater detail.

Figure 2:
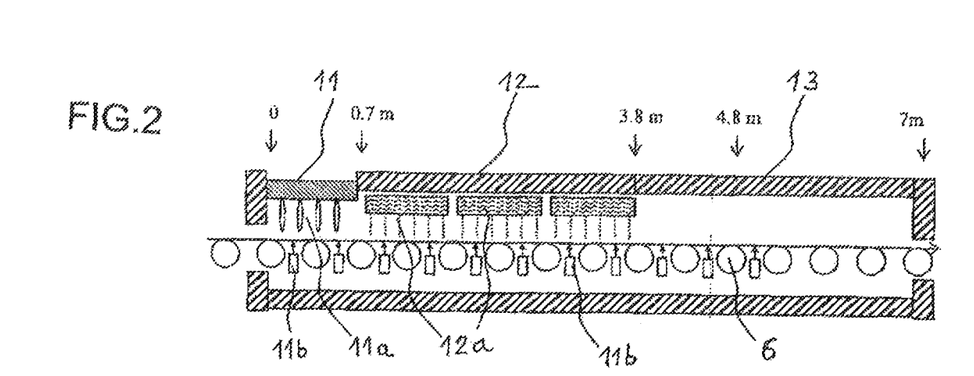
FIG. 2 is a larger scale schematic view of part of FIG. 1 showing further details of the thermal conditioning unit.

To obtain the desired temperature and duration, a heating and cooling system is designed according to the invention as follows, shown in FIG. 2:

A positive heat flux of 60 kW/m² is imposed at the upper face over a length of 0.7 m (initialization zone 11), in particular by combustion heating 11a.

At the opposite face, the same length is cooled with a heat flux of −15 kW/m², in particular by convection cooling devices 11b, with air blowing.

The upper surface is then heated with a flux of 25 kW/m² over a length of 3.1 m (holding zone 12), in particular with radiant heating devices 12a.

At the opposite face, from the position 0.7 m, cooling is provided with a flux of −25 kW/m² over a length of 4 m.

A homogenization zone 13 follows the holding zone 12.

Figure 3:
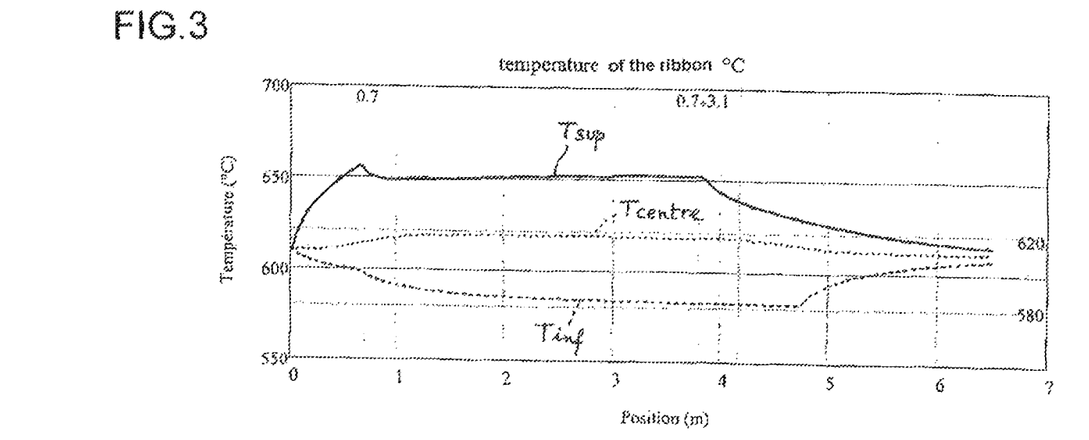
FIG. 3 is a diagram showing the ribbon temperature on the y-axis as a function of the longitudinal position on the x-axis in the case of a constant treatment temperature.

FIG. 3 shows the temperature profiles in the glass ribbon, with the curves Tsup for the upper surface temperature, Tinf for the lower surface temperature, Tcentre for the centre temperature. The temperature in ° C. is plotted on the y-axis, and the position in meters is plotted on the x-axis.

The heat flux of the reinforced heating at the start of conditioning serves to establish a thermal gradient more rapidly in the ribbon. The heat fluxes, positive and negative, on the two faces, are not balanced in this section, thereby serving to slightly increase the average temperature of the ribbon.

The desired temperature of 650° C. at the ribbon surface is rapidly obtained. The cooling prevents the temperature of the lower face from rising above 620° C., which is a critical temperature for the marking of the ribbon by the rollers.

The temperature at the lower face falls to about 580° C. This temperature is still sufficient to avoid incipient freezing of the ribbon with the risk of deformation.

The heating and cooling are then balanced on both faces over a distance of 3.1 m, between the positions 0.7 m and 3.8 m, thereby serving to maintain a stable thermal gradient across the glass ribbon. Throughout the surface treatment process, a temperature of 650° C. is thus maintained at the upper face and 580° C. at the lower face.

At the position of 3.8 m in the diagram of FIG. 3, the heating of the upper face is stopped while maintaining the cooling in order to homogenize the ribbon temperature in its thickness (homogenization zone). The temperature of the upper face then decreases rapidly even without cooling of the upper face, due to the deep diffusion of heat from the ribbon. A cooling of this upper face would serve to accelerate this temperature homogenization. The cooling continues on the lower face up to the 4.8 m position. In this way, the average temperature of the ribbon is lowered, thereby serving to restore the initial ribbon temperatures at about the 7 m position, before the application of thermal conditioning according to the invention.

The thermal conditioning unit may be terminated at the 3.8 m position if the first zone of the lehr is thermally adapted. In this case, it is important to compensate for the difference in ribbon temperature at the inlet of the lehr by reinforced cooling, of the upper face over a limited distance.

Figure 4:
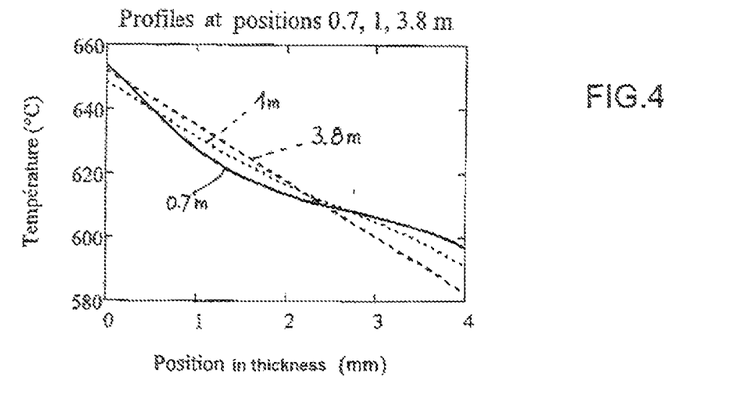
FIG. 4 is a diagram showing the ribbon temperature on the y-axis as a function of the position in the thickness on the x-axis in the case of a constant treatment temperature.

The diagram in FIG. 4 shows the vertical temperature profile of the ribbon along the thermal conditioning zone. The temperature is plotted on the y-axis, and the position in the thickness is plotted on the x-axis. The solid line corresponds to the profile at the 0.1 m position in the unit, and the dotted line corresponds to the profile at the 1 m position and the dashed line to the 3.8 m position.

The temperature of 650° C. is reached with a profile that is still curved but is rapidly linearized. At the 1 m position, the temperature profile is still slightly curved. At the 3.8 m position, the profile is linear. However, the surface treatment of the glass may already begin at the 0.7 in position because the target temperature is reached.

To determine the heat fluxes required for the thermal conditioning of the ribbon, it is first necessary to determine the conductivity of the glass. Glass has the particular feature of being conductive simultaneously by phonons and photons: however, only the photons emitted in the "opaque" part of the absorption spectrum contribute to the "active" conductivity.

The active conductivity of a clear soda-lime float glass was determined in the 600-700° C. range by a linear approximation:

$$\lambda(T) = (a0 + a1 \cdot T)[W/m \cdot K]$$

With the coefficients $a0=0.9$ and $a1=8.9*10^{-4}*K^{-1}$

The literature contains articles dealing in greater detail with conductivity, thermal diffusivity, and its determination for other glass grades, for example M. Lazard, S. André, D. Maillet, hit. J. of Heat and Mass Transfer 47 (2004), pages 477 to 487.

With the thickness of the glass sheet (4 mm) and the surface temperature required for the treatment (650° C.) and the temperature fixed for the lower face (580° C.), the heat flux to be imposed across the sheet is then determined.

$$q = \frac{\lambda(T_{sup}) + (T_{inf})}{2} \cdot \frac{(T_{sup}) - (T_{inf})}{\text{thickness}}$$

With the parameters of the example discussed above, a flux of 25 kW/m² is obtained, to be established in the holding zone. This flux was used in the simulation shown in FIG. 3. Temperatures close to the target temperatures are effectively obtained.

To determine the length of the initialization zone, that is the time required to reach the target temperatures at the upper and lower face and an establishment of a more or less linear gradient, another approach is used to determine the initialization length for various glass speeds, various thicknesses or thermal diffusivities.

A dimensionless number called the Peclet number serves to determine the optimal conditions for a thermal diffusion process combined with mass transport as applied according to the invention to heat the moving glass, in our case, the temperature diffusion direction is perpendicular to the mass transport direction corresponding to the ribbon travel. This particular feature demands a redefinition of the conventional Peclet number using a unidimensional approach with the same diffusion and transport direction.

This redefinition is based on 2 characteristic times, the characteristic time for the diffusion of heat in depth and the characteristic time for the horizontal transport of the glass.

The characteristic time for the diffusion of heat at depth $t_{diff}$ is given by $t_{diff} = (\text{thickness}/2)^2/\text{thermal diffusivity}$.

The characteristic time for horizontal transport of the ribbon in the initialization zone $t_{conv}$ is given by $t_{conv} = \text{zone length/ribbon speed}$.

The ratio between $t_{diff}/t_{conv}$ defines the Peclet number Pe.

$$Pe = \frac{t_{diff}}{t_{conv}} = \frac{(\text{thickness} \cdot 0.5)^2}{\text{thermal\_diffusivity}} \cdot \frac{\text{speed}}{\text{length}}$$

The length of initialization zone is such that the Peclet number is between 0.5 and 15 and favorably between 3 and 5. The temperature profile is thus sufficiently established in depth to ensure good temperature stability on the lower and upper faces.

In the above example, the length of the initial nation zone was determined at 0.7 m on the basis of the Peclet number of 3. FIG. 4 shows that this length leads to a temperature profile in the glass thickness with a good in depth heat diffusion at the 0.7 m position. It is therefore possible to stop the intended treatment.

After having defined the length, the heat flux to be injected into the initialization zone is easy to estimate. The average temperature between the initial glass temperature and the target surface temperature is calculated. Then, with the speed, density and specific heat of the glass, the energy flux required to reach this average temperature is calculated. The division of this flux by the length of the initialization zone gives the thermal flux density to be injected into the glass.

The same argument is used to determine the thermal flux density for cooling the lower face in the initialization zone. The same method is then used to dimension the length and fluxes of the successive thermal conditioning zones of the treatment unit.

Figure 5:
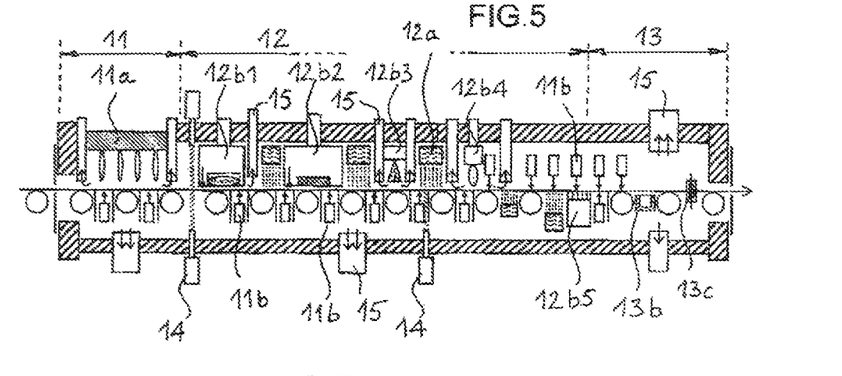
FIG. 5 shows a longitudinal section of a treatment The unit as claimed in the invention comprising four successive treatment devices at the upper face.

The following exemplary embodiment of the invention shown in FIG. 5 shows a treatment unit comprising a thermal initialization zone 11, a treatment zone 12 and a thermal homogenization zone 13.

The initialization zone 11 comprises a combustion heating device 11a.

In the treatment zone 12, several successive units serve to obtain a chemical conversion of the glass and/or a stacking of the layers. According to the example in FIG. 5, the treatment zone 12 comprises:

above the glass ribbon supported by the rollers, in succession, a plasma treatment unit 12b1, a CVD unit for reactor) 12b2 and a SP unit 12b3, a flame CVD unit 12b4, then, for treating the lower face of the ribbon, and below the ribbon, a CVD unit 12b5 with means for lifting by blowing a gas under the ribbon to support it in the absence of rollers, heating means 12a for example radiant by infrared or microwave.

Cooling devices 11b, in particular by it blowing, are provided on the opposite face to the treated face.

The homogenization zone 13 comprises a water cooler with insulation 13b, followed by a device 13c with upper and lower crossbeams provided with thermocouple means for measuring the ribbon temperature.

The surface temperature of the treated face is adjusted to the length of the zone according to the invention to optimize each treatment, the temperature of the lower face being maintained in the target range, between 550° C. and 620° C. for soda-lime glass. This temperature adjustment is carried out by heating, equalizing or cooling means according to the need to heat, equalize or cool the upper face of the glass as a function of the outlet temperature of the preceding treatment and the target temperature for the next treatment inlet.

FIG. 5 shows the temperature measuring means 14, for example by optical pyrometer or using thermocouples built-in to the deposition equipment. Also shown are devices 15 for recovering the gases from heating (combustion flues), deposition systems and coolers. The cooling air preheated by the ribbon could be recovered for combustion of the melting furnace. According to the type of ribbon treatment gas, the gases may be filtered and/or recovered by combustion of the melting furnace.

We shall now consider the various possibilities of heating the glass. The heating methods can be classed as surface methods, particularly appropriate for injecting heat via the surface, and volume methods, known for their ability to heat materials in volume.

1. Surface Methods:

Radiation (heating by absorption of the radiation in the opaque spectrum of the glass), for example electrical resistor, radiant flame or laser, Hot air (convection and conduction at, the glass surface), Hot gas (radiation, convection and conduction of a combustion), Plasma (ionized gas in contact with the glass sheet)

2. Volume Methods

Microwave (dielectric heating),

Induction (heating by dissipation of electrical currents),

Radiation, with wavelengths corresponding to an optical thickness of about 1 according to the glass type and thickness.

In general, the heating of thin glass plates by microwave or induction reveals two main difficulties:

poor absorption and poor yield, particularly for a glass at low temperature, deep penetration into the volume (instead of a limited depth).

Volume heating means have the advantage of providing a heat "reserve" under the treated surface with a non-linear temperature profile in the glass thickness. This serves to limit the surface temperature drop of the treated face during a cooling treatment. Simultaneously, the cooling of the lower face serves to maintain it at the target temperature.

An electrically conductive coating, a reflective coating or a low emissive coating, leads to the reflection of an infrared radiation. If would therefore not be possible to heat the glass sufficiently with an infrared radiation across the coated face. The glass or the layer could be heated by radiation if the latter has a different length, for example microwave or induction. The heating means employed may also be convective.

The heating means may also be selected so as to exploit the properties of the previously deposited layers. Thus, induction heating would serve mainly to heat a conductive layer, for example metallic.

The heating means could serve to obtain a particular transverse temperature profile, for example an alternation between two temperature levels, in order to create a treatment of variable intensity along the width of the glass.

The means for heating the face may comprise a ramp of burners extending transversally across the width of the ribbon and of which the flames are directed at the face of the ribbon to be engraved.

The heating and cooling mans for the upper ace of the glass may be built into the treatment unit.

The cooling means may be radiant means, for example formed by a tube extending transversally across the width of the glass and internally conveying a cooling fluid, in particular air or water, this tube being located close to the treated face. The cooling means may also be a convective means by blowing a gas on the glass. This gas may be different or identical to the one present in the treatment unit.

The inventive method is also characterized in that the cooling means for the lower face of the glass does not lead to excessive cooling of the mechanical glass support equipment.

When it is necessary to cool one face, this may be obtained by a cooling device or by natural cooling associated with the design of the chamber of the surface treatment unit. For example, a thin thermal insulation of the chamber or the opening of hatches will serve to favor a natural cooling of the glass.

We should now examine the case of electric heating in greater detail, that is by radiation of electrical resistors, which is commonly used in lehrs. If only one surface of the glass is to be heated, the spectral aspects of such a heating must be considered.

Figure 6:
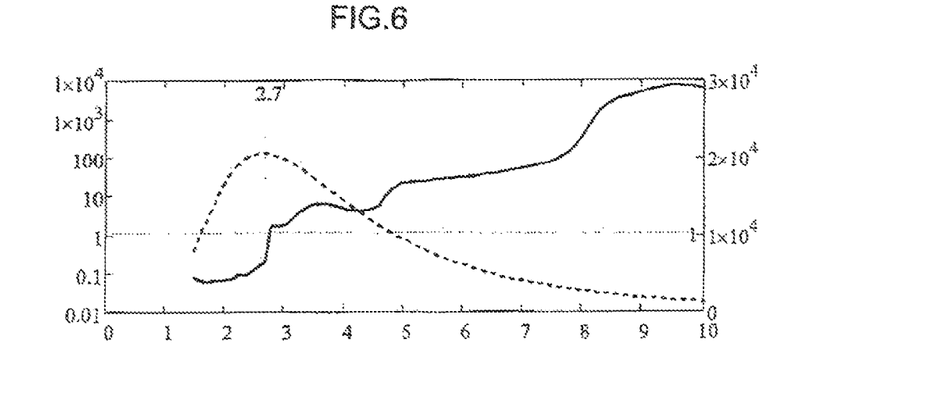
FIG. 6 is a diagram showing the absorption spectrum of a clear soda-Time float glass and the spectrum of a black body.

FIG. 6 shows, in a solid line, the absorption spectra of a clear soda-lime float glass, 4 mm thick, and in a dashed line the spectrum of a black body at 825° C. The wavelengths expressed in microns are plotted on the x-axis. The optical thickness is plotted on the y-axis on the left-hand scale, while the black body radiation expressed in W/m² µm is plotted on the y-axis on the right-hand scale.

This figure shows that the radiation of a black emitter is essentially absorbed by the glass surface for wavelengths above 2.7 µm. The calculation of a radiant exchange between 2 infinite plates serves to determine the necessary conditions for transmitting the net thermal radiation of 25 kW/m² required in steady-state conditions according to the first exemplary embodiment. For this purpose, the black emitter must have a surface temperature of 825° C. At this temperature, also emits 22 KW/m² in the optical window of the glass. This radiation crosses the ribbon and heats and rollers and other equipment below. A black or gray emitter is therefore only partially suitable for heating the glass surface. It is preferable to use a spectral emitter with a reduction of the emissions below 2.7 µm. Another solution is to use convective heating with air or low emissive flue gases.

Figure 7:
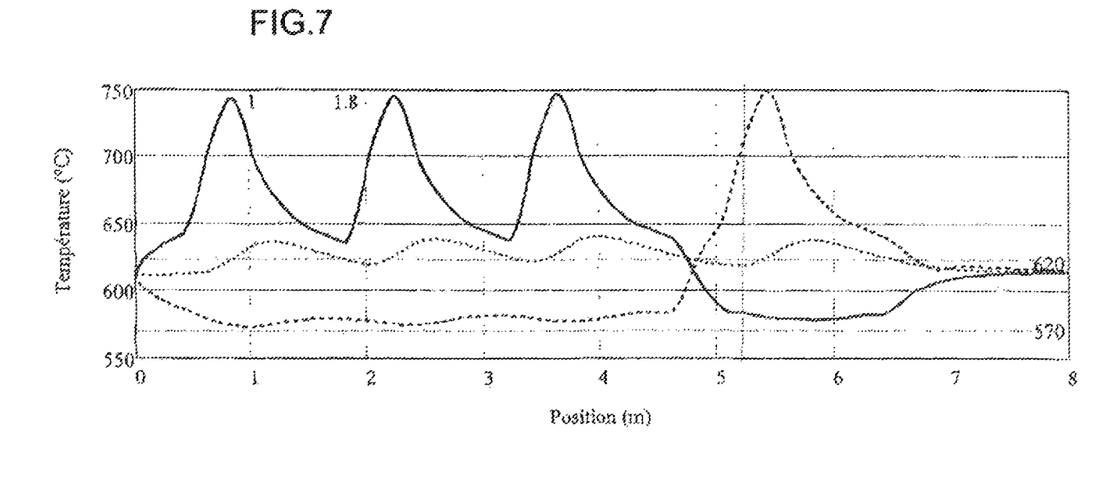
FIG. 7 is a diagram showing the ribbon temperature on the y-axis as a function of the longitudinal position on the x-axis in the case of a treatment temperature adjusted with the use of 4 CVD reactors, including 3 at the upper face and 1 at the lower face.

FIG. 7 shows a thermal simulation of another exemplary embodiment according to the invention with three CVD reactors placed at, the upper face and one CVD reactor placed at the lower face. The float glass ribbon has a thickness of 3 mm and a speed of 15 m/min. The glass is of the clear soda-lime type. The reactors have a length of 800 mm and cause a heat loss of the ribbon surface which varies between 25 kW/m² at the beginning of the reactor and ends at 10 kW/m².

In FIG. 7, the position expressed in meters along the treatment unit is plotted on the x-axis, where the temperature in ° C. is plotted on the y-axis. The solid curve corresponds to the temperature of the upper face of the glass ribbon, while the thick dashed curve corresponds to the temperature of the lower face, and the intermediate dotted curve corresponds to the temperature of the centre at the ribbon.

An initialization zone serves to establish the thermal gradient in the glass thickness, as described in the first exemplary embodiment. Then, to anticipate the heat loss of the CVD reactors, a short-term heating is applied upstream of each reactor. This heating serves to heat the face to be treated to a temperature of about 750° C. so that the temperature of the class surface in the central position of the reactor remains above 658° C. The position of the first reactor (length 0.8 m) is located between 1 m (beginning of the reactor) and 1.8 m (end of the reactor) as shown in FIG. 7. The other reactors are located at the equivalent positions after the short-term heating.

After the third reactor placed on the upper face, a new initialization zone serves to reverse the thermal gradient in the glass. The upper face is now at a temperature of about 580° C. and thus ensures the mechanical stability of the ribbon. The lower surface must be heated to about 750° C. for the treatment required, and then cooled. The usual distance available between two support rollers is insufficient for this heating, the treatment and the cooling of the glass. The CVD reactor is thus also designed to lift the ribbon. The upstream heating and downstream cooling devices of the reactor also contribute to supporting the glass. At the 7 m position, the ribbon support is resumed by rollers. In this position, the temperature is nearly homogenized in the thickness and is close to 610° C., the ribbon inlet temperature in the treatment unit.

The means for heating the face to be treated serves to heat the previously deposited layers.

The means for heating the face to be treated serves mainly to heat the previously deposited layers.

The means for heating the face to be treated is such that most of the radiation emitted is in the wavelengths in which the glass is opaque.

An electric field is applied in the treatment unit in order to favor the diffusion of ions in a deposited layer and/or in the glass.

The invention claimed is:

1. A unit for treating the surface of flat glass, in particular in the form of a ribbon or a plate, particularly by modifying the chemical, optical or mechanical properties, or by the deposition of one or more thin layers, comprising heating and cooling means for creating a heat flux across the glass, means for heating the face to be treated to bring it to the requisite temperatures and during the periods necessary to obtain effective treatments of its surface, and means for cooling the opposite face to lower its temperature to a level corresponding to a viscosity of between $10^{13}$ dPas and $2.3 \times 10^{10}$ dPas; and further comprising in succession:
an initialization zone with means for heating the face to be treated and means for cooling the opposite face to create a heat flux across the glass and to reach the target temperatures at the face to be treated and at the opposite face,
a treatment zone with means for heating and means for treating the face to be treated, and means for cooling the opposite face to maintain a stable thermal gradient across the glass ribbon throughout the surface treatment, and
a homogenization zone, with cooling means, so that the temperature of the face to be treated decreases rapidly; and
wherein the length of the initialization zone for reaching the target temperatures at the face to be treated and that the opposite face is determined so that the Peclet number Pe is between 0.5 and 15 as determined by $$Pe = \frac{t_{diff}}{t_{conv}} = \frac{(\text{thickness} \cdot 0.5)^2}{\text{thermal\_diffusivity}} \cdot \frac{\text{speed}}{\text{length}}$$

with:
$t_{diff}$=characteristic time for the diffusion of the heat at depth, $t_{diff}$ being given by $t_{diff}$=(thickness/2)²/thermal diffusivity, thickness being a thickness of the ribbon and thermal diffusivity being a thermal diffusivity of the glass, and
$t_{conv}$=characteristic time for the horizontal transport of the ribbon in the initialization zone, $t_{conv}$ being given by $t_{conv}$=zone length/ribbon speed, zone length being the length of the initiation zone and speed being a transport speed of the ribbon in the initiation zone.

2. The unit as claimed in claim 1, wherein it integrates one or more successive treatment devices placed on the same face or on the opposite faces of the glass.

3. A method for treating the surface of flat glass in the form of a ribbon or a plate by modifying the chemical, optical or mechanical properties, or by the deposition of one or more thin layers, wherein a controlled thermal gradient is created in the glass thickness by means for heating the face to be treated so that it is maintained at a target temperature during the periods necessary to obtain effective treatments of its surface, and by means for cooling the opposite face, so that this opposite face has a viscosity of between $10^{13}$ dPas and $2.3 \times 10^{10}$ dPas, wherein in an initialization zone (11) the face to be treated is heated by the heating means to reach the target temperature and to establish the thermal gradient within the glass, and the opposite face is cooled by the cooling means, wherein the average temperature of the ribbon is increased, and wherein a length of the initialization zone for reaching the target temperatures at the face to be treated and at the opposite face is determined so that a Peclet number, Pe, is between 0.5 and 15 as determined by $$Pe = \frac{t_{diff}}{t_{conv}} = \frac{(\text{thickness} \cdot 0.5)^2}{\text{thermal\_diffusivity}} \cdot \frac{\text{speed}}{\text{length}}$$

with:
$t_{diff}$=a characteristic time for diffusion of heat at depth, $t_{diff}$ being given by $t_{diff}$=(thickness/2)$^2$/thermal diffusivity, thickness being a thickness of the ribbon and thermal diffusivity being a thermal diffusivity of the glass, and
$t_{conv}$=a characteristic time for horizontal transport of the ribbon in the initialization zone, $t_{conv}$ being given by $t_{conv}$=zone length/speed, zone length being the length of the initialization zone and speed being a transport speed of the ribbon in the initialization zone,
in a treatment zone (12) the face to be treated is heated by the heating means for a treatment period, while the opposite face to the treated face is maintained at a temperature $T_{inf}$ for the treatment period by the cooling means, and
in a homogenization zone (13), the face opposite the treated face is cooled.

4. The method as claimed in claim 3, wherein, in the initialization zone, a first heat flux from the means for heating on the face to be treated is greater than a second heat flux from the means for cooling on the opposite face, thereby serving to increase the average temperature of the ribbon.

5. The method as claimed in claim 3, wherein in the treatment zone, a first heat flux from the means for heating on the face to be treated is about the same as a second heat flux from the means for cooling thereby serving to maintain a stable thermal gradient across the glass ribbon.

6. The method as claimed in claim 3, wherein in the homogenization zone the, heating is stopped while the cooling is maintained.

7. The method as claimed in claim 3, wherein the cooling of one face of the glass results from a cooling device or a natural cooling associated with the design of the homogenization zone.

8. The method as claimed in claim 5, wherein a temperature of the upper face of the glass is adjusted in the treatment zone.

9. The method as claimed in claim 3, wherein the temperature of the face of the glass to be treated is higher than 620° C., while the temperature of the opposite face of the glass is between 550° C. and 620° C. in the treatment zone in the case of a soda-lime glass supported by mechanical means such as rollers.

10. The method as claimed in claim 3, wherein in the treatment zone, the means for heating causes the temperature of the upper face at a point on the ribbon to alternate between a high temperature value and a low temperature value.

11. The method as claimed in claim 3, wherein the heating means serves to obtain a transverse temperature profile by applying different temperature levels across a width of the glass.

12. The method as claimed in claim 3, wherein the heating of the face to be treated is carried out by means of a volume heating serving to produce a heat reserve under the face to be treated, giving rise to a non-linear temperature profile in the glass thickness.

13. The method as claimed in claim 3, wherein the face to be treated includes one or more layers deposited thereon, and the means for heating the face to be treated serves to heat the one or more layers.

14. The method as claimed in claim 3, wherein the face to be treated includes one or more layers deposited thereon, and the means for heating, the face to be treated serves to heat at least one of the one or more layers.

15. The method as claimed in claim 3, wherein the means for heating the face to be treated are such that heat radiation emitted therefrom is substantially in wavelengths in which the glass is opaque.

16. The method as claimed in claim 3, wherein the face to be treated includes one or more layers deposited thereon, and an electric field is created in the treatment zone so as to promote the diffusion of ions in the one or more layers or in the glass.

17. The method as claimed in claim 3, wherein the chemical composition pressure and temperature of the atmosphere in the treatment zone are adapted to each treatment carried out.

* * * * *